(12) United States Patent
Yi et al.

(10) Patent No.: US 6,491,146 B1
(45) Date of Patent: Dec. 10, 2002

(54) DAMPING ADJUSTABLE SHOCK ABSORBER FOR A BICYCLE

(76) Inventors: Chen-Shing Yi, 238, Hsing Cheng Rd., Tachia, Taichung Hsien (TW); Star Jwo, 55-12, Hsin Pu Li, Tunghsiao, Miaoli Hsien (TW)

( * ) Notice: Subject to any disclaimer, the term of this patent is extended or adjusted under 35 U.S.C. 154(b) by 0 days.

(21) Appl. No.: 09/934,353

(22) Filed: Aug. 21, 2001

(51) Int. Cl.[7] .................................................. F16F 9/34
(52) U.S. Cl. .............................. 188/319.2; 188/322.15; 267/64.26
(58) Field of Search .............................. 188/319.2, 304, 188/313, 299.1, 322.15, 289; 267/64.26, 226; 280/276, 283

(56) References Cited

U.S. PATENT DOCUMENTS

| | | | | |
|---|---|---|---|---|
| 1,205,433 A | * | 11/1916 | Christman | 188/283 |
| 4,159,756 A | * | 7/1979 | Murakami et al. | 188/282.5 |
| 6,105,988 A | * | 8/2000 | Turner et al. | 188/319.1 |
| 6,135,434 A | * | 10/2000 | Marking | 188/315 |
| 6,279,703 B1 | * | 8/2001 | Mete | 188/319.1 |
| 6,382,370 B1 | * | 5/2002 | Girvin | 188/299.1 |

* cited by examiner

Primary Examiner—Christopher P. Schwartz
Assistant Examiner—Xuan Lan Nguyen
(74) Attorney, Agent, or Firm—Harness, Dickey & Pierce, P.L.C.

(57) ABSTRACT

A shock absorber includes opposing first and second cylinders and first and second pistons disposed in and cooperating with the first and second cylinders to confine first, second and third chambers thereamong. The second and third chambers are filled with a damper-fluid. The second piston is formed with first and second down-flow channels and an up-flow channel for permitting up and down-flows of the damper-fluid between the second and third chambers. A hollow shaft extends in the first and second cylinders and is formed with an opening for permitting the down-flow of the damper-fluid via the second down-flow channel. A damping adjusting rod is mounted in the shaft and is movable in an axial direction to a first axial position, in which, the opening is blocked by the damping adjusting rod, and to a second axial position, in which, the damping adjusting rod moves away from the opening.

6 Claims, 13 Drawing Sheets

DAMPING ADJUSTABLE SHOCK ABSORBER FOR A BICYCLE

BACKGROUND OF THE INVENTION

1. Field of the Invention

This invention relates to a damping adjustable shock absorber for a bicycle riding on different road conditions.

2. Description of the Related Art

Shock absorbers for bicycles are used to provide a damping effect to mitigate shocks that are generated upon riding on a rough road. However, conventional shock absorbers normally provide a limited range of damping effects and cannot be adjusted to provide a wider range of damping effects for different road conditions.

SUMMARY OF THE INVENTION

Therefore, it is an object of the present invention is to provide a damping adjustable shock absorber for a bicycle that is capable of overcoming the aforementioned drawback.

According to the present invention, a shock absorber comprises: opposing first and second cylinders which are coupled to and which are movable toward each other in an axial direction relative to the first and second cylinders during a compression stroke and away from each other during an extension stroke, the first cylinder having opposing first fixed end and first free end, the second cylinder having opposing second fixed end and second free end, the second free end extending through the first free end and into the first cylinder in the axial direction; a hollow shaft disposed in and extending through the first cylinder and into the second cylinder in the axial direction, and having a secured end that is fixed to the first fixed end of the first cylinder, and an end section that is opposite to the secured end, that is disposed in the second cylinder, that defines an inner space, and that is formed with a opening; a first piston disposed in the first cylinder, sleeved movably on the hollow shaft so as to cooperate with the first cylinder to confine a first chamber therebetween, and coupled securely to the second free end of the second cylinder so as to be moved by the second cylinder in the axial direction, the first chamber being filled with an inner gas; a second piston disposed in the second cylinder and sleeved securely on the end section of the hollow shaft so as to cooperate with the first piston and the second cylinder to confine second and third chambers thereamong at two opposite sides of the second piston, and so as to be moved by the hollow shaft in the axial direction, the second and third chambers being filled with a damper-fluid, the second piston being formed with first and second down-flow channels and a up-flow channel, the second down-flow channel being constantly in fluid communication with the opening, which is capable of being in fluid communication with the third chamber via the inner space when exposed to the inner space; a first valve associated with the first down-flow channel for permitting unrestricted low velocity flow of the damper-fluid from the third chamber to the second chamber via the first down-flow channel during the compression stroke, in which, the first and second cylinders move toward each other in the axial direction, which, in turn, moves the hollow shaft and the second piston toward the second cylinder to compress the damper-fluid in the third chamber, and moves the first piston toward the first cylinder to compress the inner gas in the first chamber; a second valve associated with the second down-flow channel for permitting a medium velocity flow of the damper-fluid from the third chamber to the second chamber via the second down-flow channel and the opening during the compression stroke; a third valve associated with the up-flow channel for permitting unrestricted low velocity flow of the damper-fluid from the second chamber to the third chamber via the up-flow channel during the extension stroke, in which, the compressed damper-fluid in the third chamber pushes the hollow shaft and the second piston to thereby move the first cylinder away from the second cylinder, and the compressed inner gas in the first chamber pushes the first piston to thereby move the second cylinder away from the first cylinder; and a damping adjusting rod disposed fittingly in the hollow shaft, and movable in the axial direction to a first axial position, in which, the opening is blocked by the damping adjusting rod and is not exposed to the inner space so that the medium velocity flow of the damper-fluid from the third chamber to the second chamber via the opening and the second down-flow channel is not permitted, and to a second axial position, in which, the damping adjusting rod moves away from the opening so as to permit the opening to be exposed to the inner space and so as to permit the medium velocity flow of the damper-fluid from the third chamber to the second chamber.

BRIEF DESCRIPTION OF THE DRAWINGS

In drawings which illustrate embodiments of the invention.

DETAILED DESCRIPTION OF THE PREFERRED EMBODIMENTS

FIGS. 1 to 4 illustrate a first embodiment of a damping adjustable shock absorber 6 of this invention for a bicycle.

The shock absorber 6 is mounted on a frame 100 of the bicycle, and includes opposing first and second cylinders 61, 62, a hollow shaft 4, first, second and third pistons 7, 8, 9, first, second, third and fourth valves 851, 831, 861, 821, a damping adjusting rod 10, an up-flow adjusting unit 5, and a down-flow adjusting unit 3.

The first and second cylinders 61, 62 are coupled to and are movable toward each other in an axial direction relative to the first and second cylinders 61, 62 during a compression stroke and away from each other during an extension stroke. The first cylinder 61 has a first fixed end 611 that is secured to a rear part of the frame 100, and a first free end 612 that is opposite to the first fixed end 611. The second cylinder 62 has a second fixed end 621 that is secured to a front part of the frame 100, and a second free end 622 that is opposite to the second fixed end 621 and that extends through the first free end 612 and into the first cylinder 61 in the axial direction.

Figure 1:
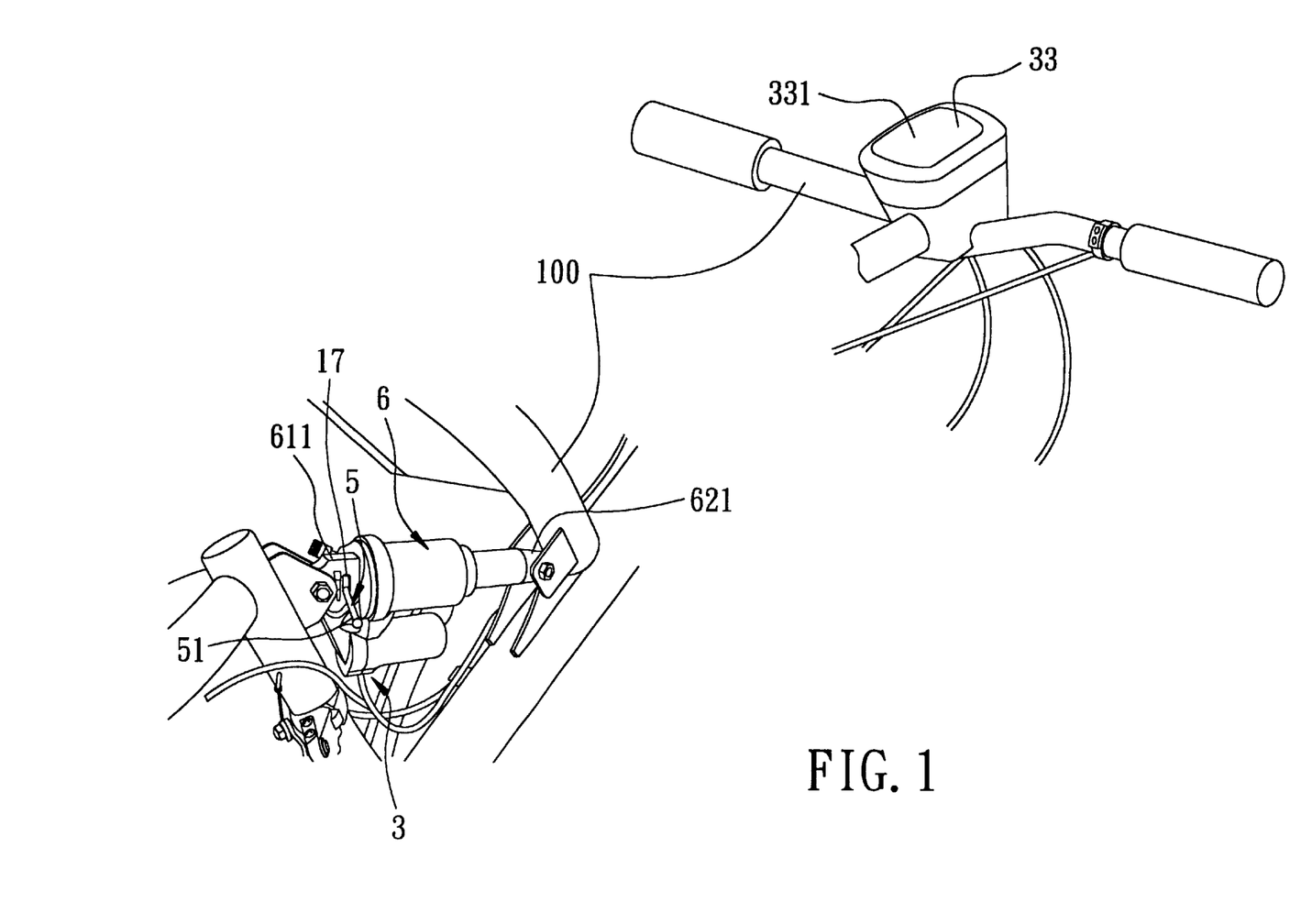
FIG. 1 is a perspective view of a first preferred embodiment of a shock absorber of this invention for a bicycle.
Figure 2:
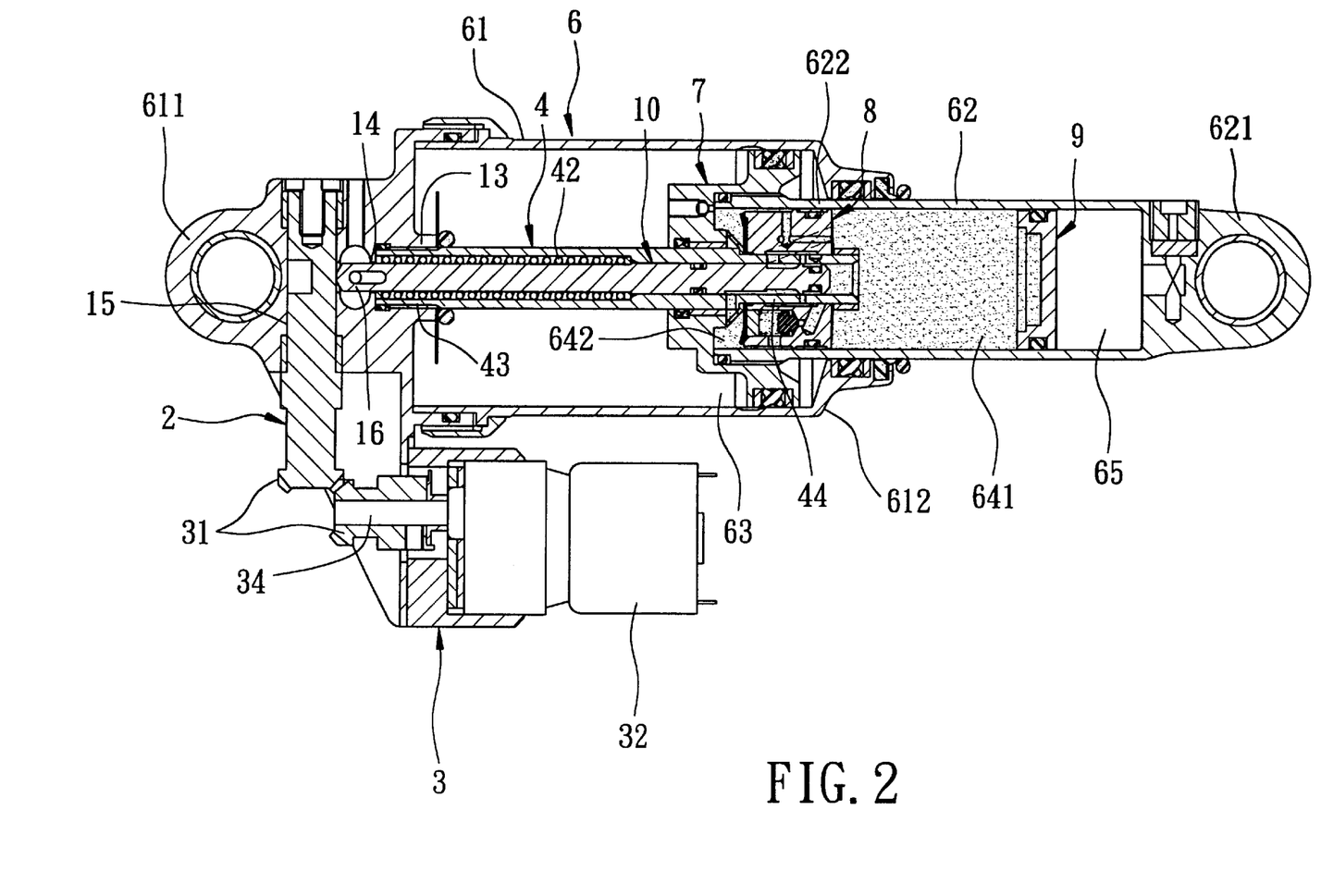
FIG. 2 is a sectional view of the shock absorber of FIG. 1.
Figure 3:
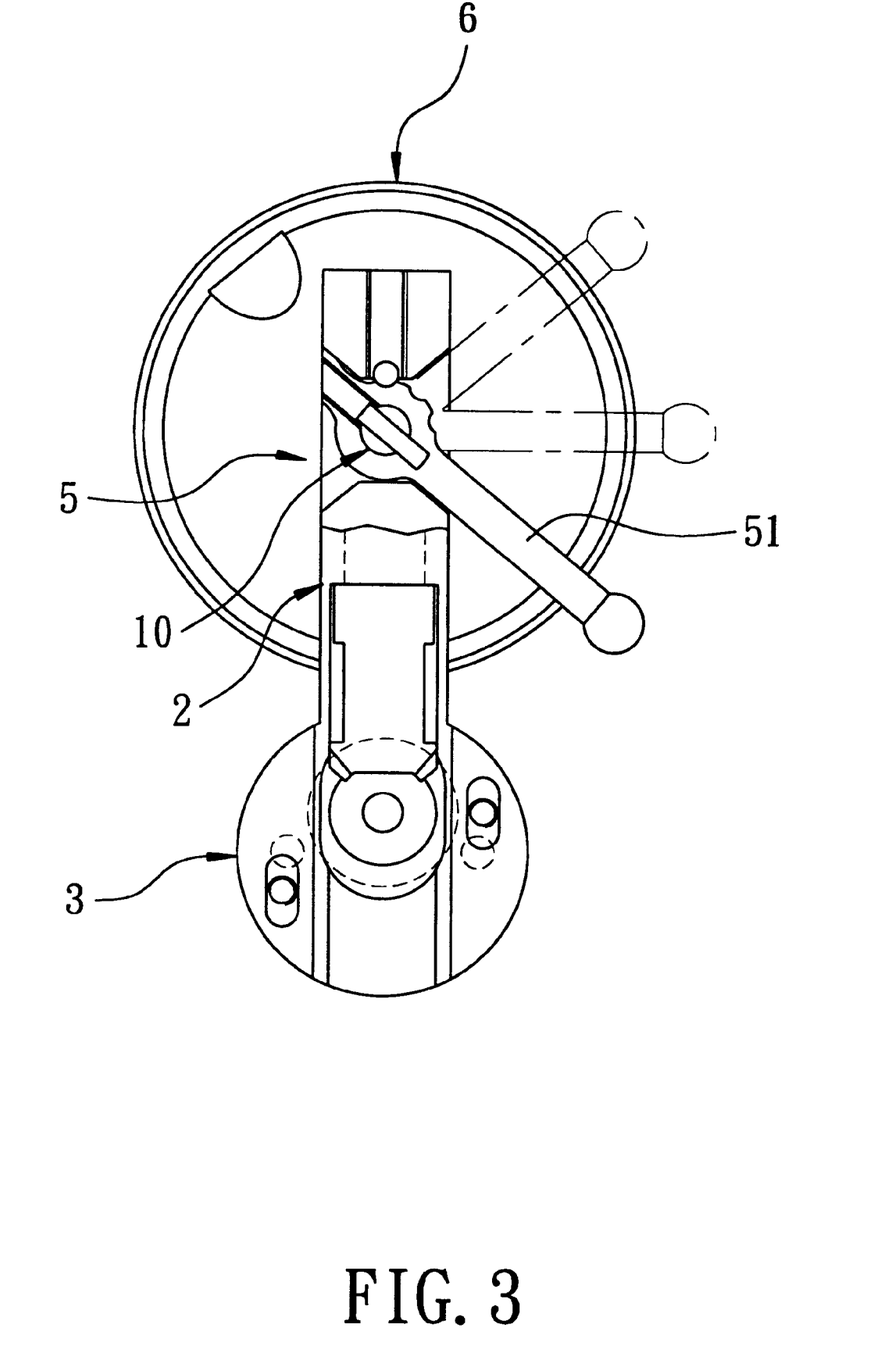
FIG. 3 is a sectional view of the first embodiment from a rear side.
Figure 4:
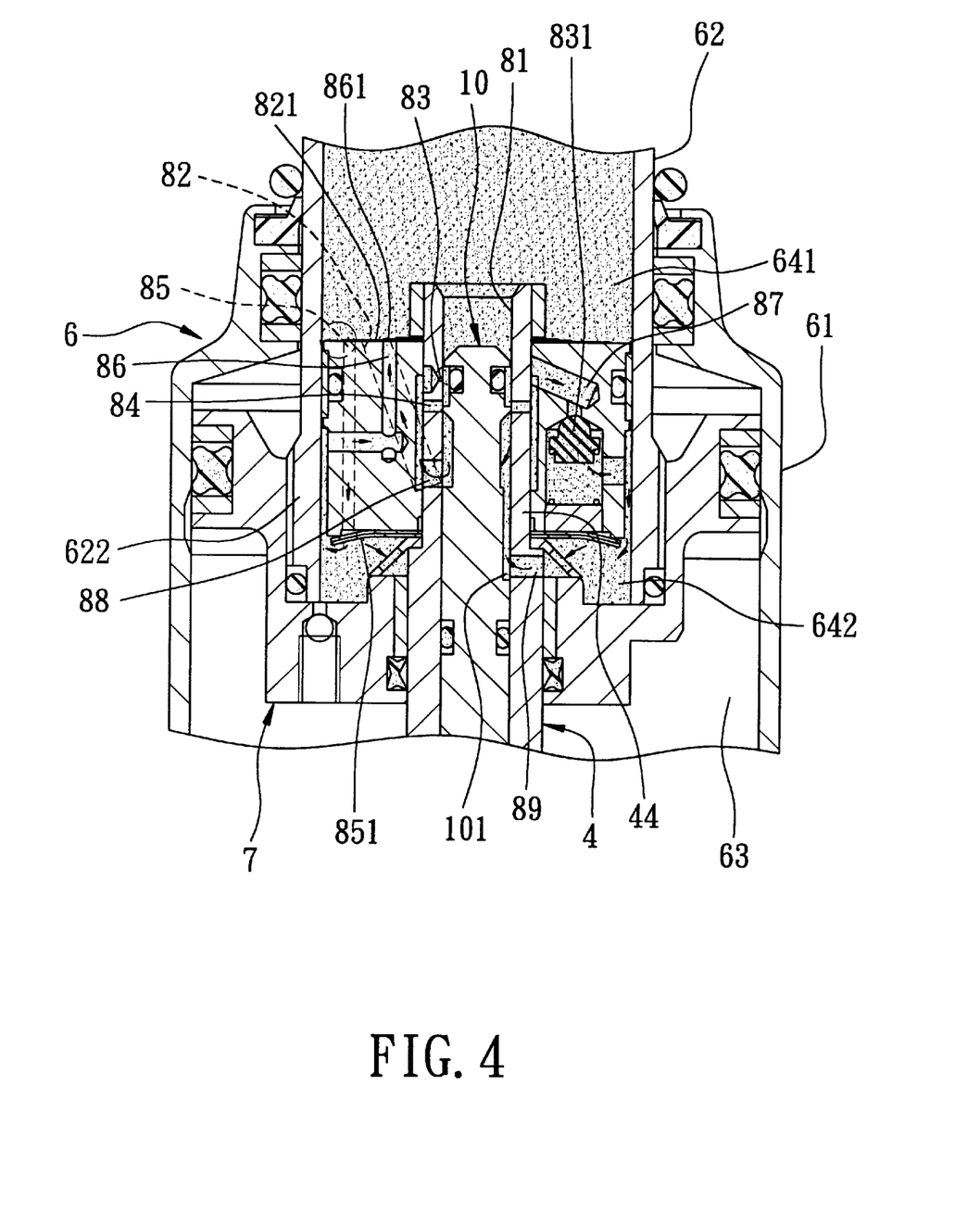
FIG. 4 is a partly sectional view of the first preferred embodiment to illustrate flow channels in the shock absorber.

The hollow shaft 4 is disposed in and extends through the first cylinder 61 and into the second cylinder 62 in the axial direction, and has a secured end 43 that is fixed to the first fixed end 611 of the first cylinder 61, and an end section 44 that is opposite to the secured end 43, that is disposed in the second cylinder 62, that defines an inner space 81, and that is formed with a first opening 83.

The first piston 7 is disposed in the first cylinder 61, is sleeved movably on the hollow shaft 4 so as to cooperate with the first cylinder 61 to confine a first chamber 63 therebetween, and is coupled securely to the second free end 622 of the second cylinder 62 so as to be moved by the second cylinder 62 in the axial direction. The first chamber 63 is filled with an inner gas.

The second piston 8 is disposed in the second cylinder 62, and is sleeved securely on the end section 44 of the hollow shaft 4 so as to cooperate with the first piston 7 and the second cylinder 62 to confine second and third chambers 642, 641 thereamong at two opposite sides of the second piston 8, and so as to be moved by the hollow shaft 4 in the axial direction. The second and third chambers 642, 641 are filled with a damper-fluid. The second piston 8 is formed with first and second down-flow channels 85, 87 and a first up-flow channel 86. The second down-flow channel 87 is constantly in fluid communication with the first opening 83, which is capable of being in fluid communication with the third chamber 641 via the inner space 81 when exposed to the inner space 81.

The first valve 851 is mounted on one side of the second piston 8 in the second chamber 642, and is associated with the first down-flow channel 85 for permitting unrestricted low velocity flow of the damper-fluid from the third chamber 641 to the second chamber 642 via the first down-flow channel 85 during the compression stroke, in which, the first and second cylinders 61, 62 move toward each other in the axial direction, which, in turn, moves the hollow shaft 4 and the second piston 8 toward the second cylinder 62 to compress the damper-fluid in the third chamber 642, and moves the first piston 7 toward the first cylinder 61 to compress the inner gas in the first chamber 63.

The second valve 831 is disposed in and is associated with the second down-flow channel 87 for permitting a medium velocity flow of the damper-fluid from the third chamber 641 to the second chamber 642 via the second down-flow channel 87 and the first opening 83 during the compression stroke.

The third valve 861 is mounted on the other side of the second piston 8 in the third chamber 641, and is associated with the first up-flow channel 86 for permitting unrestricted low velocity flow of the damper-fluid from the second chamber 642 to the third chamber 641 via the first up-flow channel 86 during the extension stroke, in which, the compressed damper-fluid in the third chamber 641 pushes the hollow shaft 4 and the second piston 8 to thereby move the associated first cylinder 61 away from the second cylinder 62, and the compressed inner gas in the first chamber 63 pushes the first piston 7 to thereby move the associated second cylinder 62 away from the first cylinder 61.

The third piston 9 is disposed in the second cylinder 62 so as to cooperate with the second piston 8 and the second cylinder 62 to confine thereamong the third chamber 641 and a fourth chamber 65 which is filled with the inner gas. The first, second, third, and fourth chambers 63, 642, 641, 65 are aligned in the axial direction in the above-described order.

Figure 5:
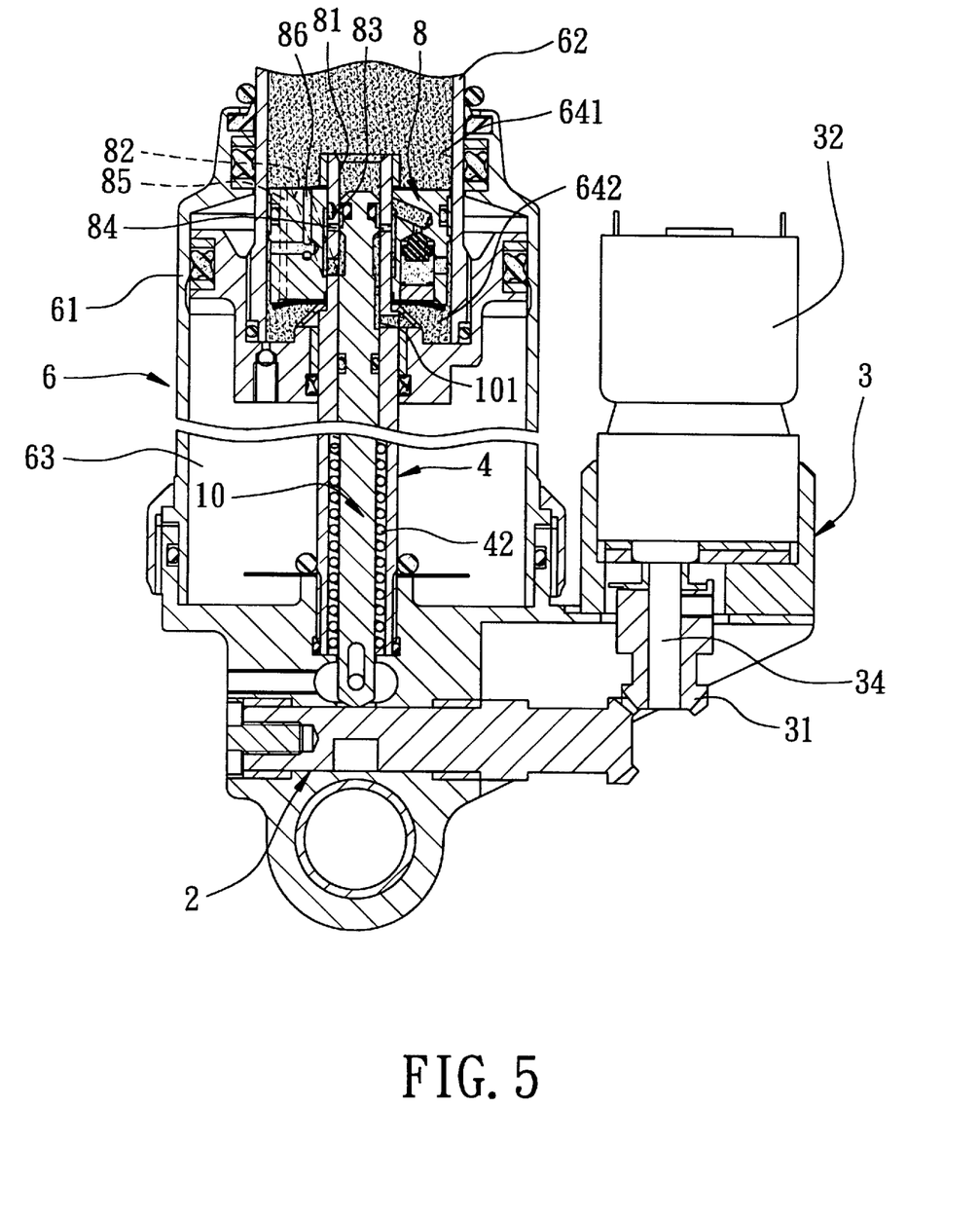
FIG. 5 is a partly sectional view of the first preferred embodiment to illustrate a damping adjusting rod in a first axial position.
Figure 6:
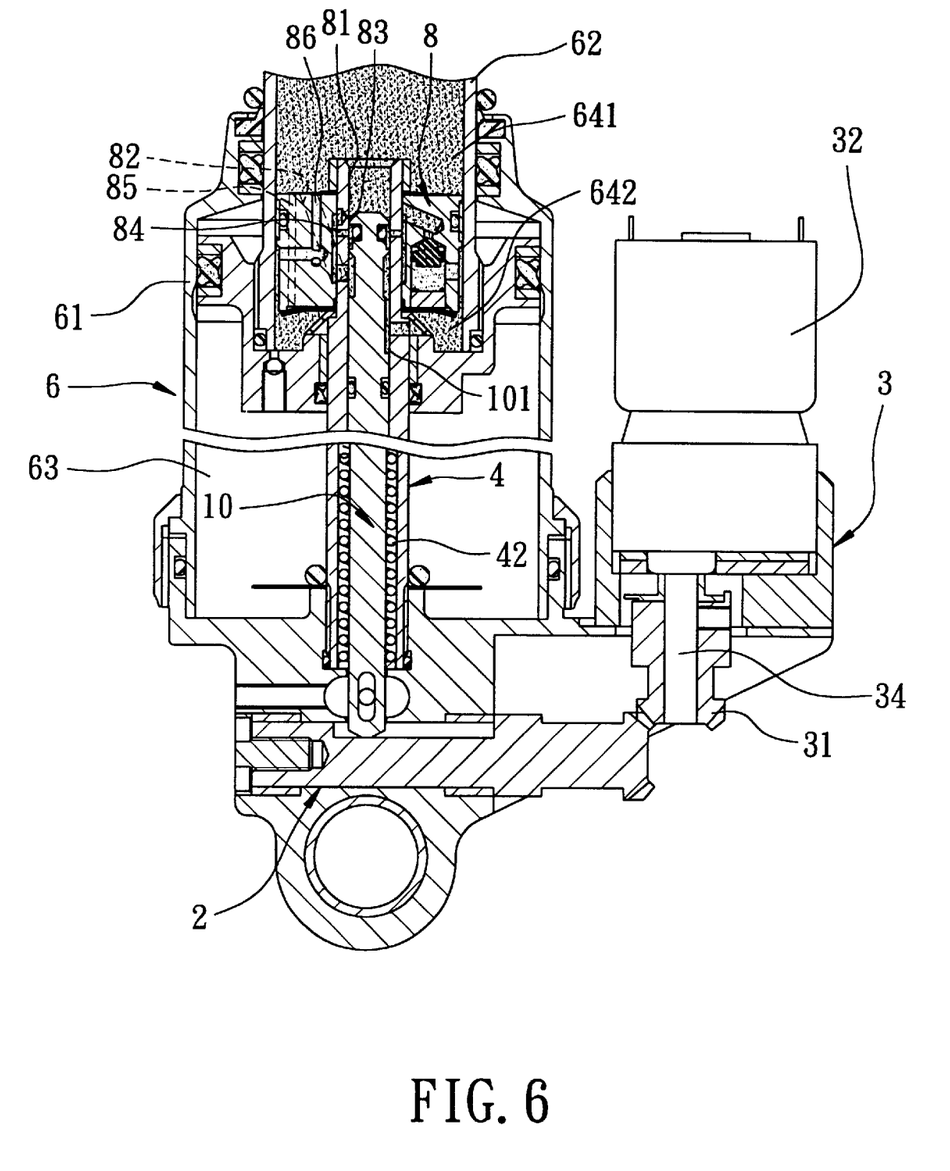
FIG. 6 is a partly sectional view of the first preferred embodiment to illustrate the damping adjusting rod in a second axial position.

The damping adjusting rod 10 is disposed fittingly in the hollow shaft 4, and is movable in the axial direction to a first axial position (see FIG. 5), in which, the first opening 83 is blocked by the damping adjusting rod 10 and is not exposed to the inner space 81 so that the medium velocity flow of the damper-fluid from the third chamber 641 to the second chamber 642 via the first opening 83 and the second down-flow channel 87 is not permitted, and to a second axial position (see FIG. 6), in which, the damping adjusting rod 10 moves away from the first opening 83 so as to permit the first opening 83 to be exposed to the inner space 81 and so as to permit the medium velocity flow of the damper-fluid from the third chamber 641 to the second chamber 642.

Figure 7:
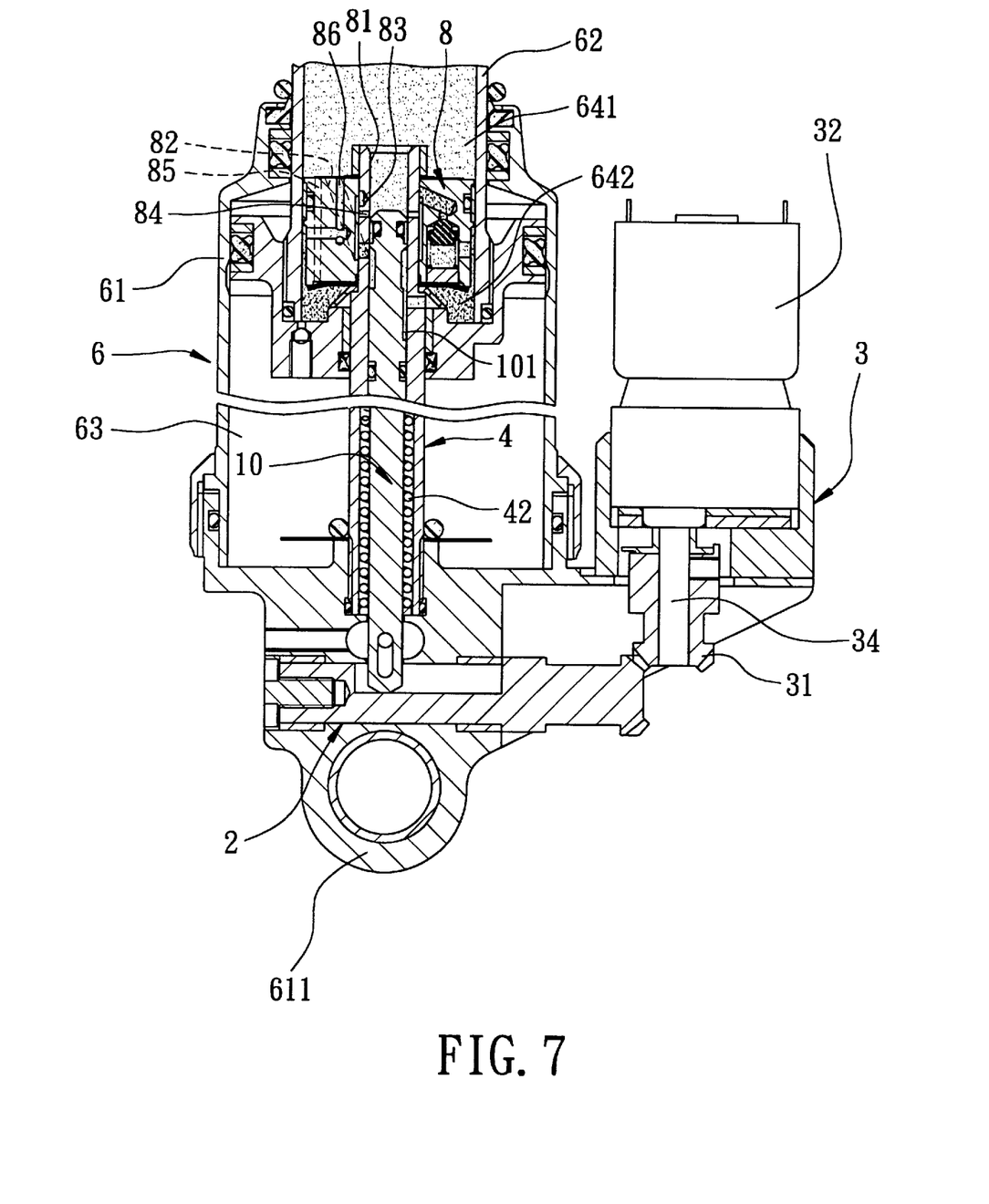
FIG. 7 is a partly sectional view of the first preferred embodiment to illustrate the damping adjusting rod in a third axial position.

The end section 44 of the hollow shaft 4 is further formed with a second opening 84 that is spaced apart from the first opening 83 in the axial direction, that is constantly in fluid communication with the second down-flow channel 87, and that is capable of being in fluid communication with the third chamber 641 via the inner space 81 when exposed to the inner space 81 so as to permit the third chamber 641 to be in fluid communication with the second down-flow channel 87 via the second opening 84. The damping adjusting rod 10 blocks the second opening 84 when disposed at the first and second axial positions, and is further movable in the axial direction to a third axial position (see FIG. 7), in which, the damping adjusting rod 10 moves away from the second opening 84 so as to permit the first and second openings 83, 84 to be exposed to the inner space 81 and so as to permit a high velocity flow of the damper-fluid from the third chamber 641 to the second chamber 642 via the second down-flow channel 87.

The second piston 8 is further formed with a second up-flow channel 82. The fourth valve 821 is mounted on the other side of the second piston 8 in the third chamber 641, and is associated with the second up-flow channel 82 for permitting medium and high velocity flows of the damper-fluid from the second chamber 642 to the third chamber 641 via the second up-flow channel 82 during the extension stroke.

Figure 8:
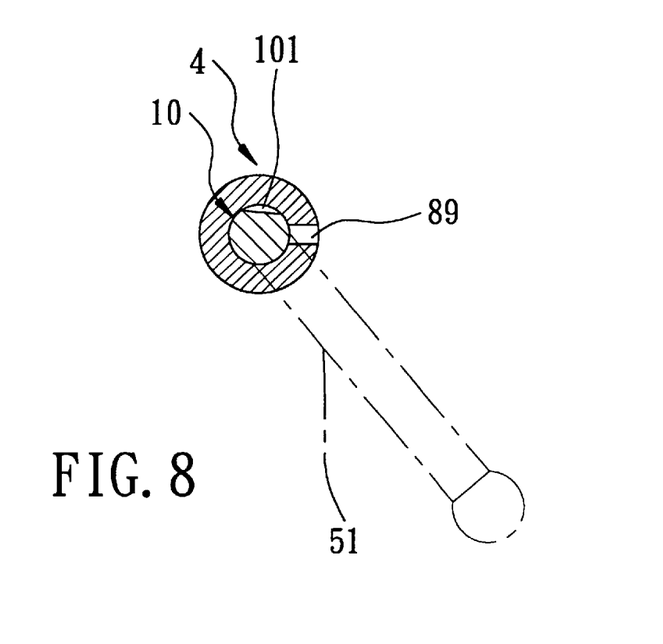
FIG. 8 is a partly sectional view of the first preferred embodiment to illustrate the damping adjusting rod in a first angular position.
Figure 9:
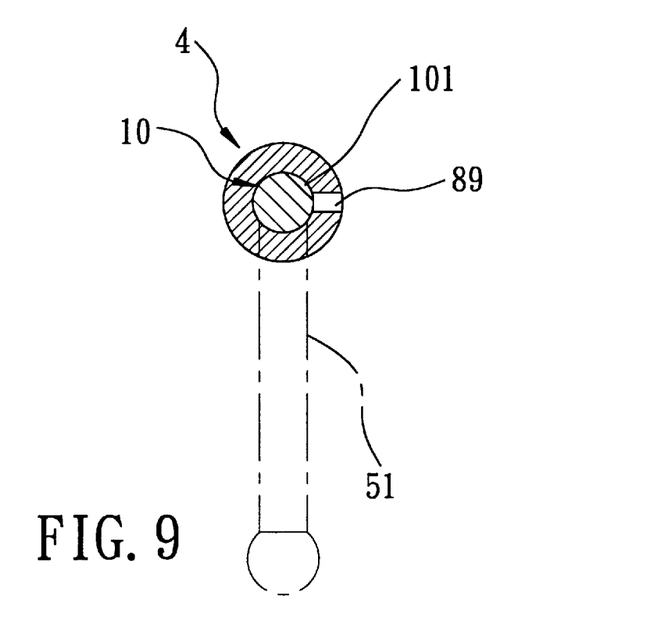
FIG. 9 is a partly sectional view of the first preferred embodiment to illustrate the damping adjusting rod in a second angular position.
Figure 10:
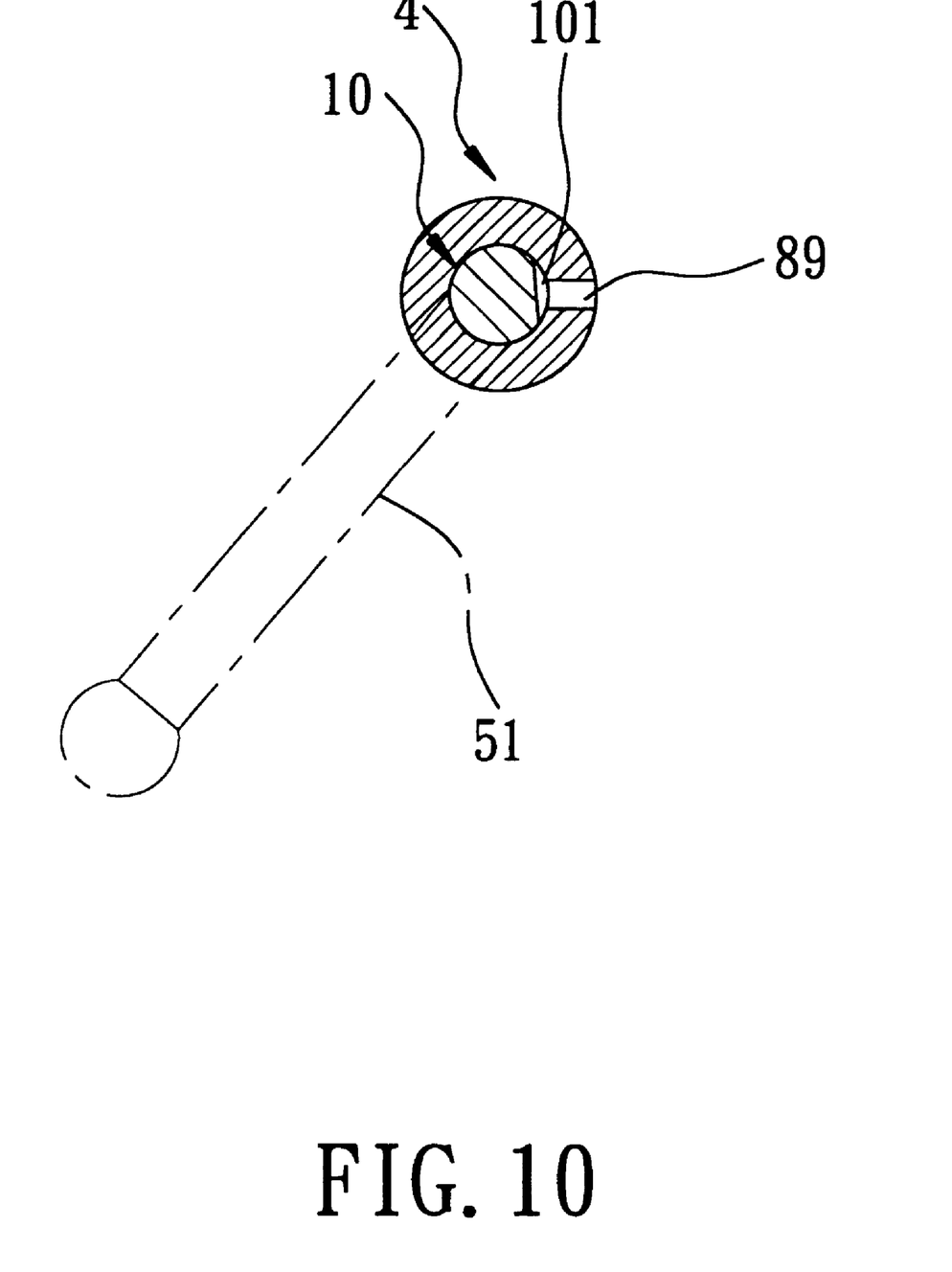
FIG. 10 is a partly sectional view of the first preferred embodiment to illustrate the damping adjusting rod in a third angular position.

The end section 44 of the hollow shaft 4 is further formed with a third opening 88 that is constantly in fluid communication with the second up-flow channel 82, and a fourth opening 89 that is constantly in fluid communication with the second chamber 642. The damping adjusting rod 10 is formed with a groove 101 that is constantly in fluid communication with the second up-flow channel 82 via the third opening 88 and that is capable of being in fluid communication with the fourth opening 89 when exposed to the fourth opening 89. The damping adjusting rod 10 is turnable in the hollow shaft 4 to a first angular position (see FIG. 8), in which, the fourth opening 89 is blocked by the damping adjusting rod 10 so that the medium and high velocity flows of the damper-fluid from the second chamber 642 to the third chamber 641 via the third and fourth openings 88, 89 and the second up-flow channel 82 are not permitted, a second angular position (see FIG. 9), in which, the fourth opening 89 is partially blocked by the damping adjusting rod 10 and is partially exposed to the groove 101 so as to permit the medium velocity flow of the damper-fluid from the second chamber 642 to the third chamber 641 via the second up-flow channel 82, the groove 101 and the third and fourth openings 88, 89, and a third angular position (see FIG. 10), in which, the fourth opening 89 is completely exposed to the groove 101 so as to permit the high velocity flow of the damper-fluid from the second chamber 642 to the third chamber 641 via the second up-flow channel 82, the groove 101 and the third and fourth openings 88, 89.

The first fixed end 611 of the first cylinder 61 is formed with a central channel 14 that extends in the axial direction, and a slot 17 that extends from the central channel 14 in a radial direction relative to the central channel 14. The hollow shaft 4 extends into the central channel 14. The damping adjusting rod 10 has a connecting end 16 that extends into the central channel 14. A coil spring 42 is disposed in the hollow shaft 4, is sleeved on the damping adjusting rod 10, and has two opposite ends respectively abutting against the hollow shaft 4 and the first fixed end 611 of the first cylinder 61.

The up-flow adjusting unit 5 includes a lever 511 which extends through the slot 17 and which is connected to the connecting end 16 of the damping adjusting rod 10. The lever 511 is operable along the slot 17 to turn the damping adjusting rod 10 selectively to the first, second, and third angular positions.

The first fixed end 611 of the first cylinder 61 is further formed with a transverse channel 15 that extends in a transverse direction relative to the axial direction.

The down-flow adjusting unit 3 includes an eccentric shaft 2 which extends into the transverse channel 15 and which is connected to the connecting end 16 of the damping adjusting rod 10. The eccentric shaft 2 is turnable so as to move the damping adjusting rod 10 in the axial direction to the first, second, and third axial positions. A driving unit 32 with a driving shaft 34 is coupled to the eccentric shaft 2 via a geared coupler 31 for turning the eccentric shaft 2.

A controller 33 with a display 331 is mounted on a handlebar of the bicycle, and is electrically connected to the driving unit 32 for displaying a current position of the damping adjusting rod 10 in the axial direction.

Figure 11:
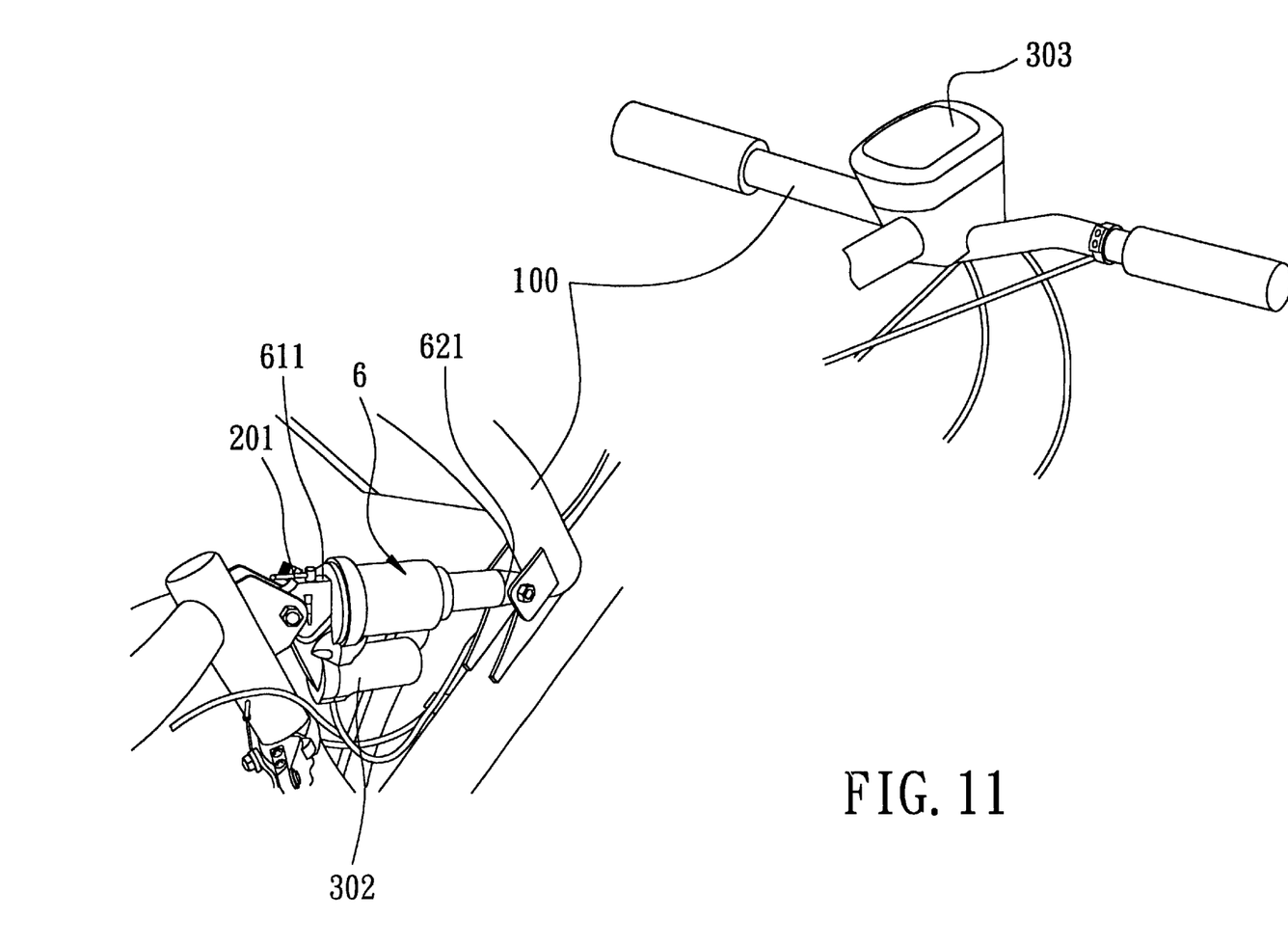
FIG. 11 is a perspective view of a second preferred embodiment of a shock absorber of this invention for a bicycle.
Figure 12:
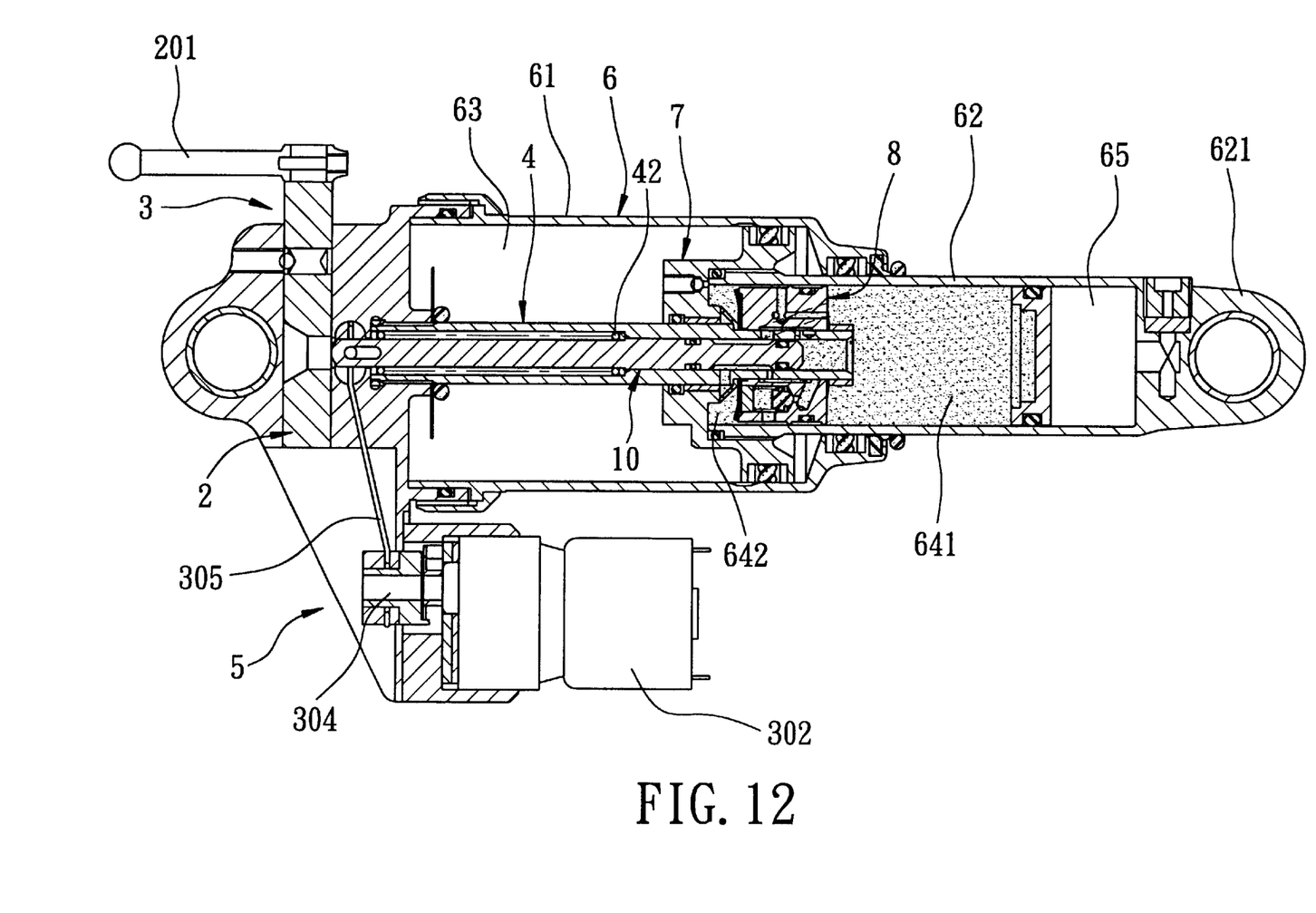
FIG. 12 is a sectional view of the shock absorber of FIG. 11.

FIGS. 11 and 12 illustrate a second preferred embodiment of a shock absorber of this invention. The shock absorber is similar to the previous embodiment of FIG. 1, except that the eccentric shaft 2 of the down-flow adjusting unit 3 is operated via a handle 201 and that the up-flow adjusting unit 5 includes a link 305 that is associated with the damping adjusting rod 10 and that is driven by a driving unit 302.

Figure 13:
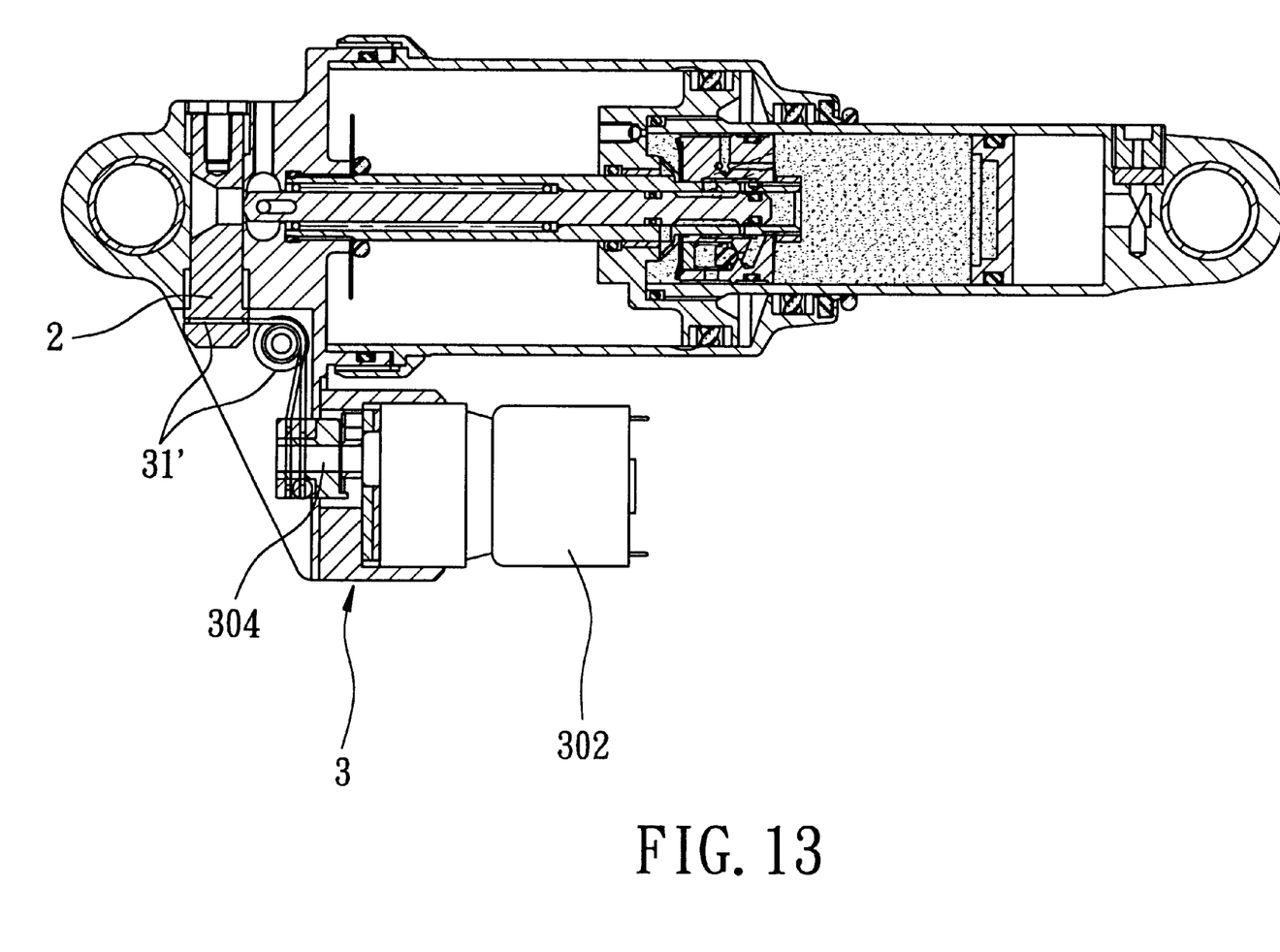
FIG. 13 is a sectional view of a third preferred embodiment of a shock absorber of this invention for a bicycle.

FIG. 13 illustrates a third preferred embodiment of a shock absorber of this invention. The shock absorber is similar to the previous embodiment of FIG. 1, except that the geared coupler 31 is replaced by a string-and-roller unit 31'.

Figure 14:
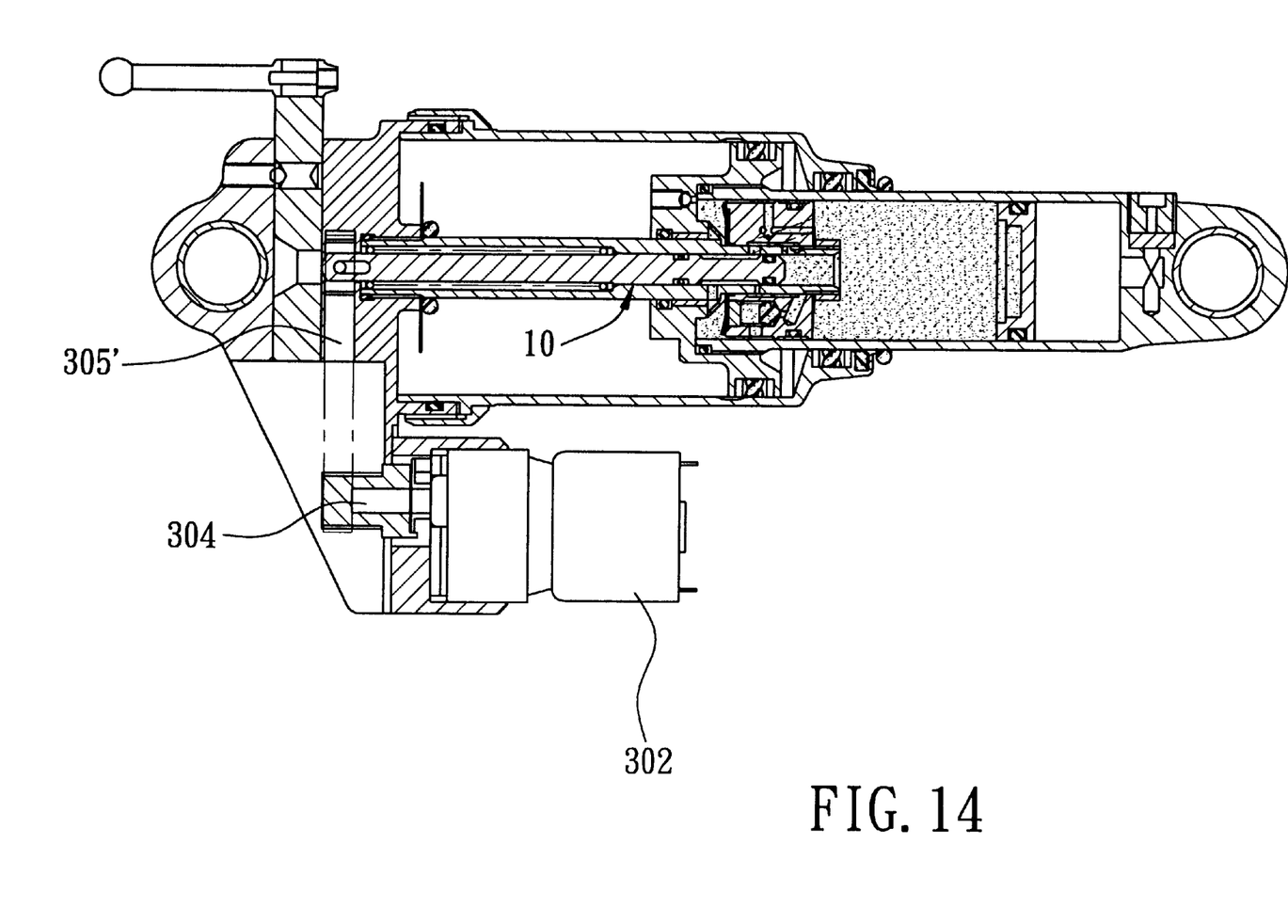
FIG. 14 is a sectional view of a fourth preferred embodiment of a shock absorber of this invention for a bicycle.

FIG. 14 illustrates a fourth preferred embodiment of a shock absorber of this invention. The shock absorber is similar to the embodiment of FIG. 12, except that the link 305 is replaced by a strap 305'.

By simply adjusting the damping adjusting rod 10 among the first, second and third axial positions and the first, second and third angular positions, the shock absorber of this invention can have various damping effects so as to adapt to different road conditions, thereby eliminating the drawback associated with the prior art.

With the invention thus explained, it is apparent that various modifications and variations can be made without departing from the spirit of the present invention. It is therefore intended that the invention be limited only as recited in the appended claims.

We claim:
1. A shock absorber comprising:
opposing first and second cylinders which are coupled to and which are movable toward each other in an axial direction relative to said first and second cylinders during a compression stroke and away from each other during an extension stroke, said first cylinder having opposing first fixed end and first free end, said second cylinder having opposing second fixed end and second free end, said second free end extending through said first free end and into said first cylinder in said axial direction;
a hollow shaft disposed in and extending through said first cylinder and into said second cylinder in said axial direction, and having a secured end that is fixed to said first fixed end of said first cylinder, and an end section that is opposite to said secured end, that is disposed in said second cylinder, that defines an inner space, and that is formed with a first opening;
a first piston disposed in said first cylinder, sleeved movably on said hollow shaft so as to cooperate with said first cylinder to confine a first chamber therebetween, and coupled securely to said second free end of said second cylinder so as to be moved by said second cylinder in said axial direction, said first chamber being filled with an inner gas;
a second piston disposed in said second cylinder and sleeved securely on said end section of said hollow shaft so as to cooperate with said first piston and said second cylinder to confine second and third chambers thereamong at two opposite sides of said second piston, and so as to be moved by said hollow shaft in said axial direction, said second and third chambers being filled with a damper-fluid, said second piston being formed with first and second down-flow channels and a first up-flow channel, said second down-flow channel being constantly in fluid communication with said first opening, which is capable of being in fluid communication with said third chamber via said inner space when exposed to said inner space;
a first valve associated with said first down-flow channel for permitting unrestricted low velocity flow of the damper-fluid from said third chamber to said second chamber via said first down-flow channel during the compression stroke, in which, said first and second cylinders move toward each other in said axial direction, which, in turn, moves said hollow shaft and said second piston toward said second cylinder to compress the damper-fluid in said third chamber, and moves said first piston toward said first cylinder to compress the inner gas in said first chamber;
a second valve associated with said second down-flow channel for permitting a medium velocity flow of the damper-fluid from said third chamber to said second chamber via said second down-flow channel and said first opening during the compression stroke;
a third valve associated with said first up-flow channel for permitting unrestricted low velocity flow of the damper-fluid from said second chamber to said third chamber via said first up-flow channel during the extension stroke, in which, the compressed damper-fluid in said third chamber pushes said hollow shaft and said second piston to thereby move said first cylinder away from said second cylinder, and the compressed inner gas in said first chamber pushes said first piston to thereby move said second cylinder away from said first cylinder; and a damping adjusting rod disposed fittingly in said hollow shaft, and movable in said axial direction to a first axial position, in which, said first opening is blocked by said damping adjusting rod and is not exposed to said inner space so that the medium velocity flow of the damper-fluid from said third chamber to said second chamber via said first opening and said second down-flow channel is not permitted, and to a second axial position, in which, said damping adjusting rod moves away from said first opening so as to permit said first opening to be exposed to said inner space and so as to permit the medium velocity flow of the damper-fluid from said third chamber to said second chamber.

2. The shock absorber of claim 1, wherein said end section of said hollow shaft is further formed with a second opening that is spaced apart from said first opening in said axial direction, that is constantly in fluid communication with said second down-flow channel, and that is capable of being in fluid communication with said third chamber via said inner space when exposed to said inner space so as to permit said third chamber to be in fluid communication with said second down-flow channel via said second opening, said damping adjusting rod blocking said second opening when disposed at said first and second axial positions and being further movable in said axial direction to a third axial position, in which, said damping adjusting rod moves away from said second opening so as to permit said first and second openings to be exposed to said inner space and so as to permit a high velocity flow of the damper-fluid from said third chamber to said second chamber.

3. The shock absorber of claim 2, wherein said second piston is further formed with a second up-flow channel, said shock absorber further comprising a fourth valve that is associated with said second up-flow channel for permitting medium and high velocity flows of the damper-fluid from said second chamber to said third chamber via said second up-flow channel during the extension stroke, said end section of said hollow shaft being further formed with a third opening that is constantly in fluid communication with said second up-flow channel, and a fourth opening that is constantly in fluid communication with said second chamber, said damping adjusting rod being formed with a groove that is constantly in fluid communication with said second up-flow channel via said third opening and that is capable of being in fluid communication with said fourth opening when exposed to said fourth opening, said damping adjusting rod being turnable in said hollow shaft to a first angular position, in which, said fourth opening is blocked by said damping adjusting rod so that the medium and high velocity flows of the damper-fluid from said second chamber to said third chamber via said third and fourth openings and said second up-flow channel are not permitted, a second angular position, in which, said fourth opening is partially blocked by said damping adjusting rod and is partially exposed to said groove so as to permit the medium velocity flow of the damper-fluid from said second chamber to said third chamber via said second up-flow channel, said groove and said third and fourth openings, and a third angular position, in which, said fourth opening is completely exposed to said groove so as to permit the high velocity flow of the damper-fluid from said second chamber to said third chamber via said second up-flow channel, said groove and said third and fourth openings.

4. The shock absorber of claim 3, wherein said first fixed end of said first cylinder is formed with a central channel that extends in said axial direction, and a slot that extends from said central channel in a radial direction relative to said central channel, said hollow shaft extending into said central channel, said damping adjusting rod having a connecting end that extends into said central channel, said shock absorber further comprising an up-flow adjusting unit that includes a lever which extends through said slot and which is connected to said connecting end of said damping adjusting rod, said lever being operable along said slot to turn said damping adjusting rod selectively to said first, second, and third angular positions.

5. The shock absorber of claim 4, wherein said first fixed end of said first cylinder is further formed with a transverse channel that extends in a transverse direction relative to said axial direction, said shock absorber further comprising a down-flow adjusting unit that includes an eccentric shaft which extends into said transverse channel and which is connected to said connecting end of said damping adjusting rod, said eccentric shaft being turnable so as to move said damping adjusting rod in said axial direction to said first, second, and third axial positions.

6. The shock absorber of claim 1, further comprising a third piston disposed in said second cylinder so as to cooperate with said second piston and said second cylinder to confine thereamong said third chamber and a fourth chamber which is filled with the inner gas, said first, second, third, and fourth chambers being aligned in said axial direction.

* * * * *